United States Patent [19]

Ohanesian

[11] Patent Number: 5,342,187
[45] Date of Patent: Aug. 30, 1994

[54] EXTRUSION SYSTEM HAVING AFTER/FORMER MEANS FOR RESHAPING TUBE OF EXTRUDANT

[75] Inventor: Harout Ohanesian, Northridge, Calif.

[73] Assignee: U.S. Polymers, Inc., Commerce, Calif.

[21] Appl. No.: 966,936

[22] Filed: Oct. 27, 1992

[51] Int. Cl.⁵ .................................................. B29C 47/90
[52] U.S. Cl. ....................................... 425/70; 49/74.1; 264/177.17; 264/209.3; 264/209.4; 264/209.8; 425/71; 425/325; 425/326.1; 425/388; 425/392
[58] Field of Search ................ 425/67, 70, 71, 388, 425/392, 325, 326.1; 49/74.1; 264/177.1, 177.17, 178 R, 209.3, 209.4, 209.8, 210.1, 210.2, 211.13

[56] References Cited

U.S. PATENT DOCUMENTS

| | | | |
|---|---|---|---|
| 2,423,260 | 7/1947 | Slaughter | 264/209.3 X |
| 3,296,661 | 1/1967 | DeMoustier | 264/177.17 X |
| 3,550,269 | 12/1970 | Yatabe et al. | 425/71 X |
| 3,700,763 | 10/1972 | Van Kralingen | 425/71 X |
| 4,401,424 | 8/1983 | De Zen | 425/388 |
| 4,913,863 | 4/1990 | Burrafato et al. | 425/71 X |
| 5,028,376 | 7/1991 | Vanderwoude | 425/71 X |

Primary Examiner—Richard L. Chiesa
Attorney, Agent, or Firm—Price, Gess & Ubell

[57] ABSTRACT

A shutter door assembly assembled primarily from extruded plastic components is provided. The shutter door assembly includes an outer rectangular frame surrounding a pivotally attached vaned panel door. Various side, top, and bottom legs of the frame and door are constructed of a hollow extruded plastic and are securely mounted together to form a rigid, durable shutter door. The resulting shutter door has the general look and feel of an actual wooden door. An after-former device for forming extruded tubes for use in the shutter assembly is also provided. The after-former system mounts to a standard circular extrusion head, and converts a circular tube of extrudant to a desired noncircular shape, such as a rectangular shape. The after-former has a conical conduit, with an entrance aperture having a circular shape for receiving the initial extrudant and an exit aperture having the desired noncircular cross-section. As the extrudant passes through the conical conduit, the extrudant is gradually transformed to the desired noncircular cross-section.

6 Claims, 4 Drawing Sheets

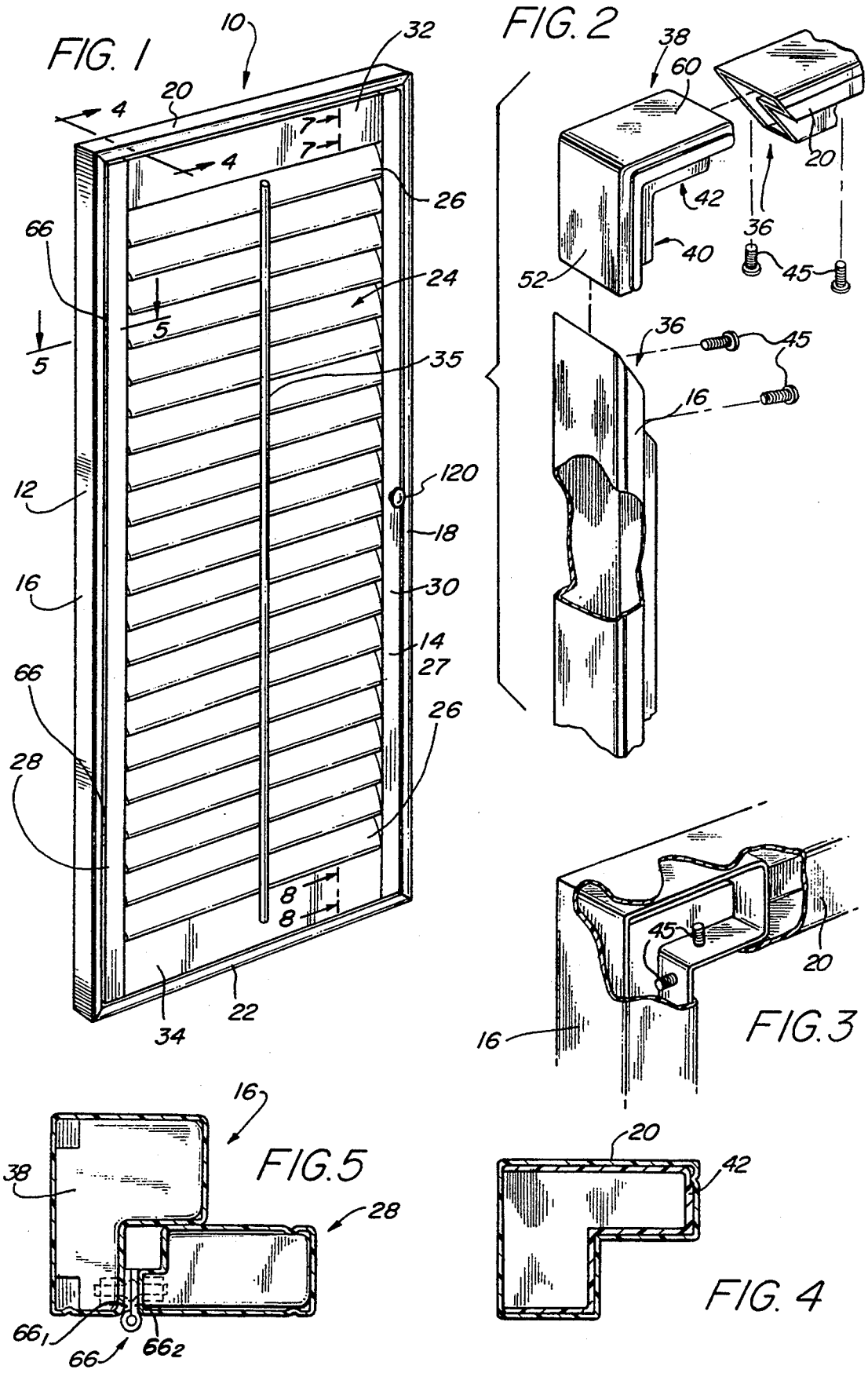

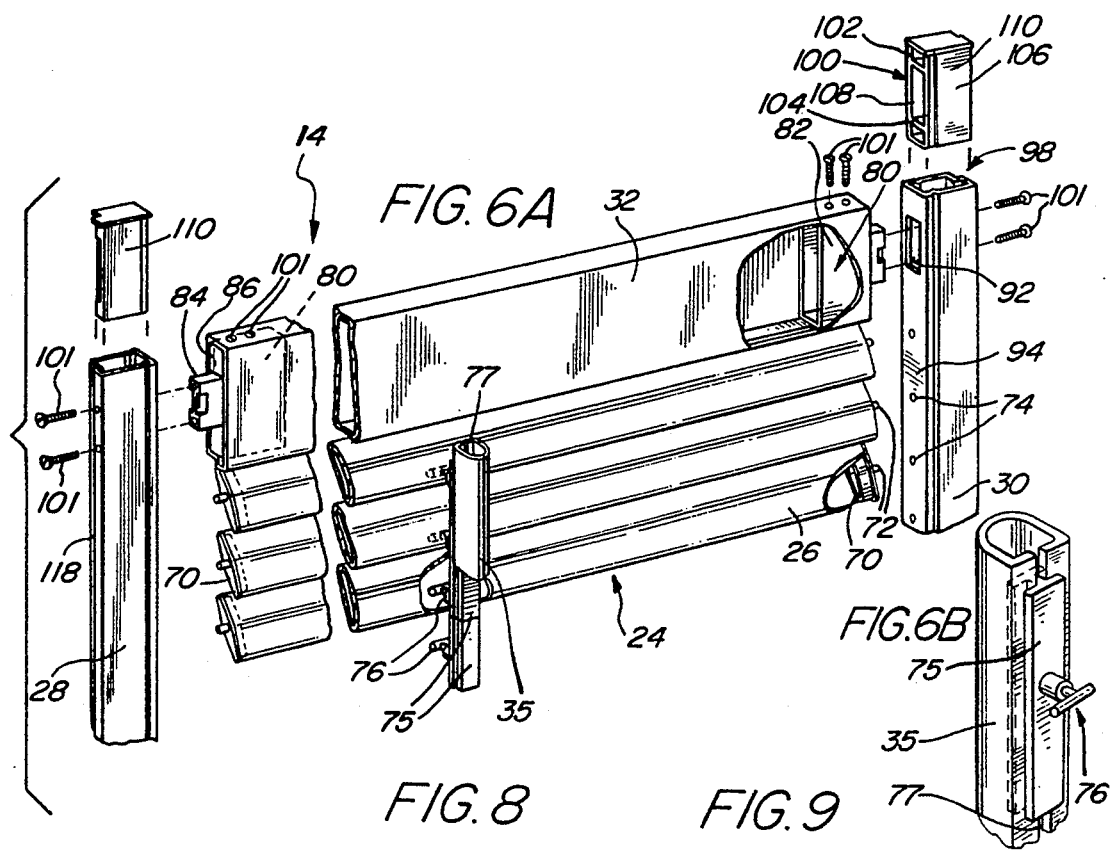
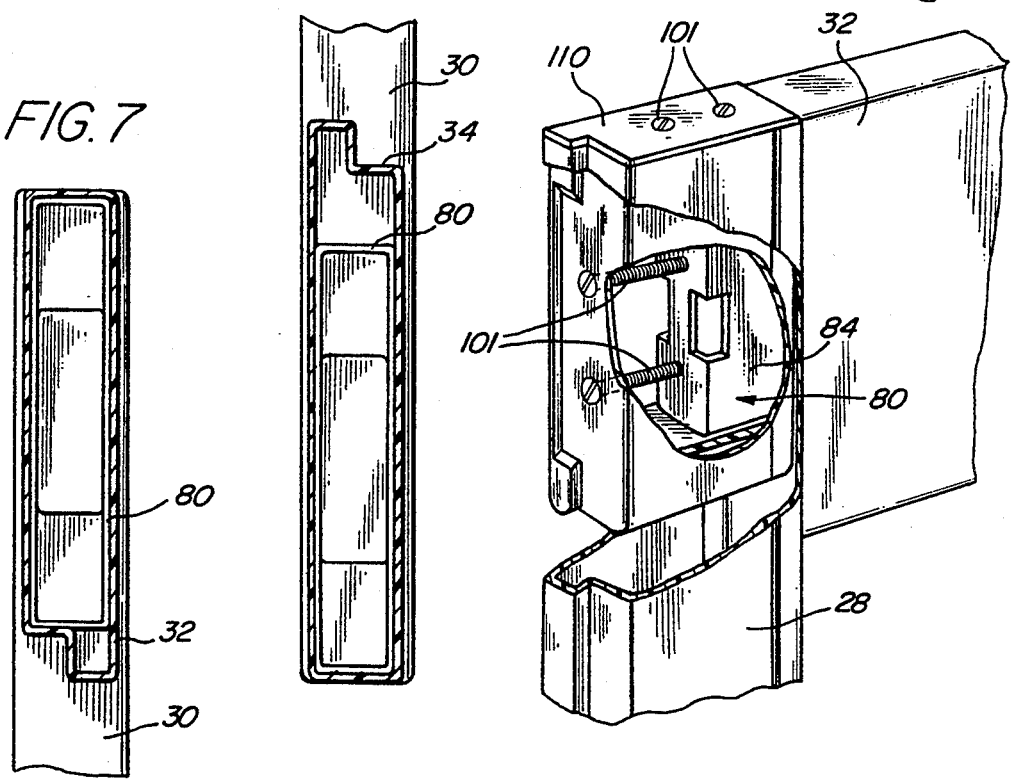

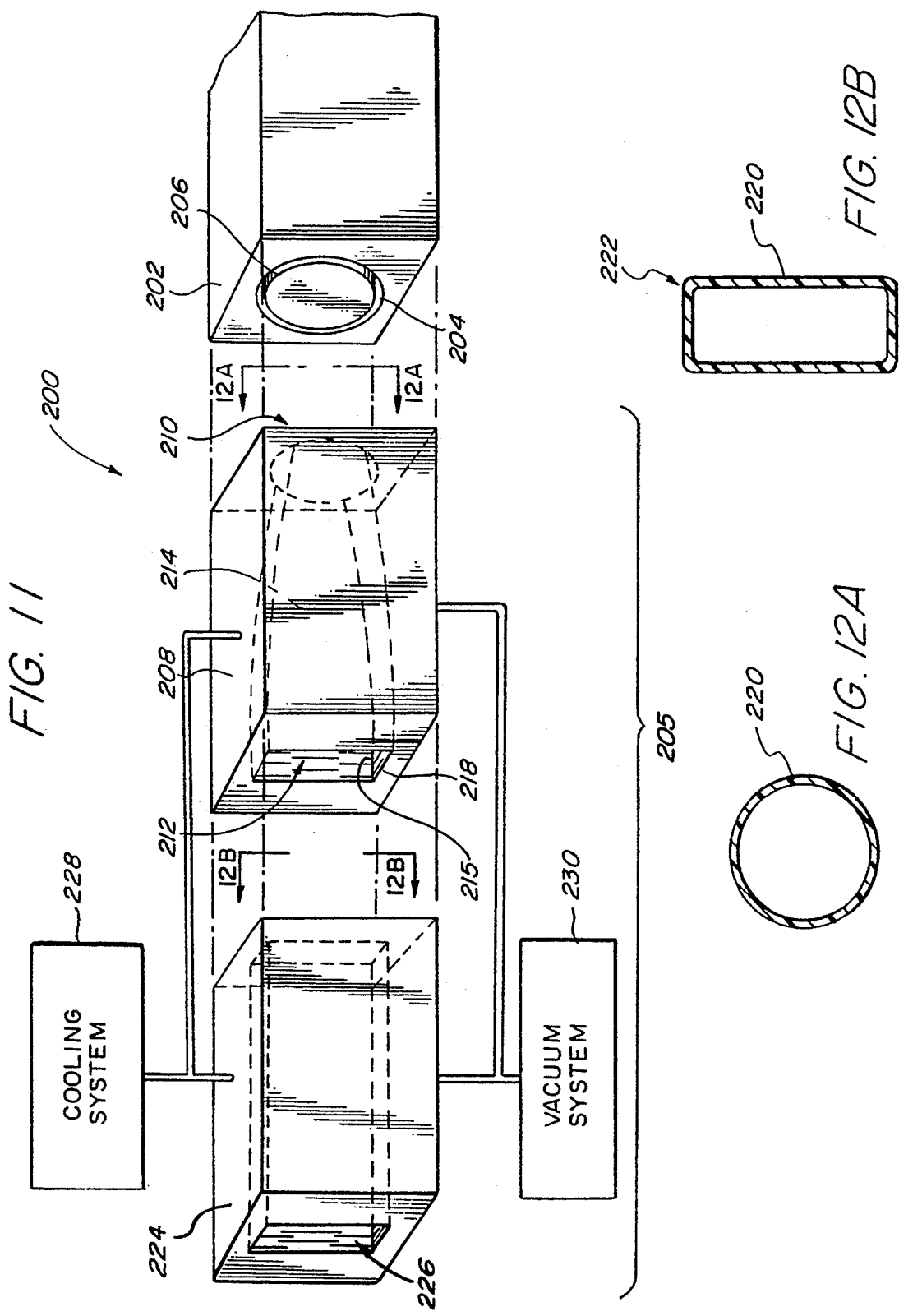

EXTRUSION SYSTEM HAVING AFTER/FORMER MEANS FOR RESHAPING TUBE OF EXTRUDANT

BACKGROUND OF THE INVENTION

1. Field of the Invention

The invention relates generally to shutter door assemblies and to fabrication methods therefore.

2. Description of Related Art

A wide variety of shutter door designs of the jalousie type have been developed over the years. These typical shutter doors are provided with a set of vanes pivotally mounted within a rectangular frame to regulate the amount of air or light passing through. Such shutter doors are typically constructed entirely of wood. Attempts have been made to fabricate shutter doors from a plastic material or the like. By constructing the shutter door from a plastic material rather than wood, a lighter and less expensive shutter door may be achieved. Further, a shutter door constructed of lightweight plastic components may be assembled more easily than a shutter door constructed entirely of wood. Thus, whereas a wooden shutter door must typically be assembled at a factory after receipt of an order from a customer, a shutter door constructed of plastic components can be assembled either by a jobber, a retailer, or a customer. Accordingly, rather than experiencing a possibly lengthy wait before receiving an assembled shutter door from a factory, a customer may receive the shutter door more promptly. Further, by allowing the shutter door components to be shipped in disassembled form to a jobber, a retailer, or a customer, rather than in assembled form, shipping costs and storage costs are greatly reduced.

Heretofore, however, no suitable plastic shutter door assemblies have been devised. Conventional plastic shutter door assemblies are often too complicated for easy assembly by a retailer or customer. Special tools or skills may be required to assemble the shutter door. Once assembled, the shutter doors are often insufficiently sturdy and durable to resist common wear and tear, especially where the shutter door is mounted to an exterior of a building and thereby must weather wind, storms, and the like.

Regarding plastic extrusion techniques in general, a wide variety of such techniques have been developed for forming plastic tubes of a variety of shapes and sizes. Typically, such devices employ an extrusion head for extruding a tube of extrudant and a calibrator for cooling the extrudant while maintaining its shape. To form a tube having a circular cross-section, an extrusion head having a circular cross-section is employed in conjunction with a calibrator having a central circular cooling conduit. The circular tube of extrudant is fed into the conduit of the calibrator, where it is cooled. A vacuum system is employed to maintain the tube of extrudant against the inside of the conduit of the calibrator, to thereby maintain the shape of the tube as the tube is cooled. To form a generally rectangular cross-sectional tube, a rectangular extrusion head is employed along with a calibrator having a rectangular cooling conduit. In general, both the shape of the cooling conduit of the calibrator and the shape of the extrusion head must match the cross-sectional shape or profile of the desired tube shape. That is, to form a circular tube, a circular extrusion head and a circular calibrator must be employed. To form a rectangular tube, a rectangular extrusion head and a rectangular calibrator conduit must be employed. Whereas a calibrator may be fairly easily provided with a central conduit having a desired shape, it is often expensive to provide for an extrusion head having an arbitrary desired profile.

To form a shutter door assembly from extruded plastic tubes, a wide variety of sizes and shapes of the tubes must be utilized. Accordingly, a wide variety of extrusion heads and corresponding calibrator conduits must be employed.

Finally, with regard to conventional extrusion techniques, tubes with rectilinear cross-sections formed from conventional extrusion techniques typically have sharp corners. These sharp corners tend to weaken the tube.

SUMMARY OF THE INVENTION

From the foregoing, it can be appreciated that there is a need to provide an improved shutter door assembly.

It is an object of the invention to provide an improved shutter door assembly which may be shipped in disassembled form for subsequent easy assembly by a jobber, retailer, or customer;

It is a further object of the invention to provide such a shutter door of a durable construction to withstand wear, tear, and weathering;

It is a further object of the invention to provide a device for forming a tube of arbitrary shape; and It is a further object of the invention to provide extruded tubes of generally rectilinear cross-section without sharp, weak corners.

These and other objects of the invention are achieved by a shutter door assembly having four hollow legs formed of extruded plastic connected by four corner blocks into a rectangular frame. The shutter door assembly includes one or more louver doors, each including a plurality of parallel extruded plastic vanes pivotally mounted to the interior of the frame. Each corner of the frame includes securing means for securing the corner blocks to the legs, and to thereby secure the legs one to another. The corner blocks each include a pair of extending arms, with the arms inserted into the ends of the hollow legs and closely received within the hollow legs for secure mounting. When both arms of a corner block are completely inserted into adjacent legs to connect the legs, the entire corner block is thereby enclosed and hidden from view within the legs.

Preferably, each louver door includes a tilting rod connecting a set of hollow extruded vanes. The tilting rod includes a set of t-hooks for engaging with slots formed along sides of the hollow vanes. By providing hollow vanes rather than solid vanes, an inexpensive and reliable t-hook mount may be utilized.

The shutter door assembly may be provided with only a single louver door, or may be provided with two or more parallel or articulated louver panels. In such an embodiment, a first louver door or panel mounts directly to the frame, and a second louver door or panel mounts to an outside or free edge of the first panel. A reinforcing mechanism may be provided to reinforce a hinge which mounts the first louver door or panel to the frame to help bear the additional weight of the second panel.

The shutter door assembly of the invention is constructed almost entirely of lightweight, but durable, extruded plastic components. Preferably, only few of the components, such as nuts or bolts, are formed from a material other than extruded plastic. The entire assembly is thereby sufficiently lightweight for inexpensive shipping and storage. Mounting the legs of the shutter door frame together with secured corner blocks ensures a sturdy, durable frame. Further, since only a relatively few components are required, the shutter door assembly is easily and quickly assembled by a jobber, a retailer, or a customer without the need for special tools and equipment. By facilitating assembly by the jobber, customer, or retailer, the shutter door assembly is shipped and stored in a compact disassembled form. Hence, shipping and storing costs are further minimized. By providing a shutter door which meed not be assembled at a factory, customer orders are filled more promptly. Furthermore, a set of individual components having a range of sizes can be shipped to a retailer such that a number of shutter doors of various sizes and shapes are easily assembled by selecting components of suitable size. Thus, a wide range of custom orders for specifically-sized shutter doors are easily filled without requiring fabrication at a factory.

Once assembled, the shutter door is sturdy and durable and has the general appearance of a painted wooden shutter door. The extruded plastic components may be formed in a variety of colors.

In accordance with an alternative aspect of the invention, a device for forming an extruded tube having a desired cross-sectional shape is provided. The device transforms a tube of extrudant having an initial, typically circular, cross-section into a tube having a different, typically noncircular, cross-section, such as a rectangle, square, or L-shaped tube. The device includes a means for extruding a tube of extrudant. The device further includes an after-forming conversion conduit for receiving the tube of extrudant and for converting the tube from the initial cross-sectional shape to the desired cross-sectional shape. To this end, the conversion conduit has an entry aperture shaped and sized to receive the initial tube of extrudant, and an exit aperture having the desired cross-sectional shape. The entry aperture and the exit aperture each have peripheries of substantially the same circumference or perimeter. Further, the entry aperture and the exit aperture are connected by a generally conical conduit, which connects the periphery of the entry aperture to the periphery of the exit aperture. Means are providing for maintaining the extrudant against inner walls of the connecting conduit such that, as the tube of extrudant passes through the conduit from the entrance aperture to the exit aperture, the cross-sectional shape of the extrudant is gradually transformed from the initial cross-sectional shape to the desired cross-sectional shape.

Preferably, the initial cross-sectional shape provided by the extrusion means is substantially circular. The desired cross-sectional shape is rectangular, square, L-shaped, or any other arbitrary desired noncircular shape. The means for maintaining the extrudant against the inner walls of the connecting conduit is a vacuum system such as conventionally found in vacuum calibrators. The device is further provided with a calibrator for additionally cooling the extrudant. The calibrator includes an internal conduit having the desired cross-sectional shape for receiving the extrudant from the exit aperture of the conversion conduit and a means for cooling the extrudant as it passes through the calibrator. Preferably, the conversion conduit and calibrator are a single integral unit. The cooling system comprises a manifold of tubes surrounding the internal conduit of the combined calibrator and after-former for passing a cooling liquid within the calibrator and after-former. Also preferably, if the desired shape of the extrudant is generally rectilinear, rounded corner portions are provided on the extrudant to minimize weakness caused by sharp corner portions.

Thus, in accordance with one aspect of the invention, a device is provided for receiving a circular tube from an extrusion head and for converting the circular tube into a desired noncircular shape such as a rectangle. Unlike prior art extrusion systems, a special extrusion head need not be provided for each different desired shape. Rather, a single circular extrusion head is employed regardless of the noncircular profile of the desired final tube. Only the combined calibrator and after-former conversion conduit need to be matched to the desired shape, and a single circular extrusion head can always be used. However, if desired, a noncircular extrusion head may be used. In such an embodiment, the entry aperture of the after-former conversion conduit is shaped to match the noncircular shape of the extrusion head.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a perspective view of a shutter door constructed in accordance with a preferred embodiment of the invention;

FIG. 2 is an exploded perspective view of a portion of the shutter door of FIG. 1;

FIG. 3 is a perspective view, partially in cutaway, of the portion of the shutter door shown in FIG. 2, but shown in assembled form;

FIG. 4 is a cross-sectional view of a top leg of the shutter door of FIG. 1, taken along line 4—4;

FIG. 5 is a cross-sectional view of a portion of the shutter door assembly of FIG. 1, taken along line 5—5;

FIG. 6A is an exploded view of a portion of the shutter door of the shutter assembly of FIG. 1;

FIG. 6B is a perspective view of a portion of a tilt rod of the shutter door of FIG. 6A;

FIG. 7 is a cross-sectional view of a portion of the shutter door assembly of FIG. 1, taken along line 7—7;

FIG. 8 is a cross-sectional view of a portion of the shutter door assembly of FIG. 1, taken along line 8—8;

FIG. 9 is a perspective view, partially in cutaway, of a portion of the shutter door of FIG. 6, shown assembled;

FIG. 11 is a perspective exploded view of an extrusion system, in accordance with the invention, for forming tubes of extrudant of noncircular cross-section;

FIG. 12A is a cross-section of a tube of extrudant as would be found along line 12A—12A of FIG. 11; and FIG. 12B is a cross-section of a tube of extrudant as would be found along line 12B—12B of FIG. 11.

DESCRIPTION OF THE PREFERRED EMBODIMENTS

Figure 10A:
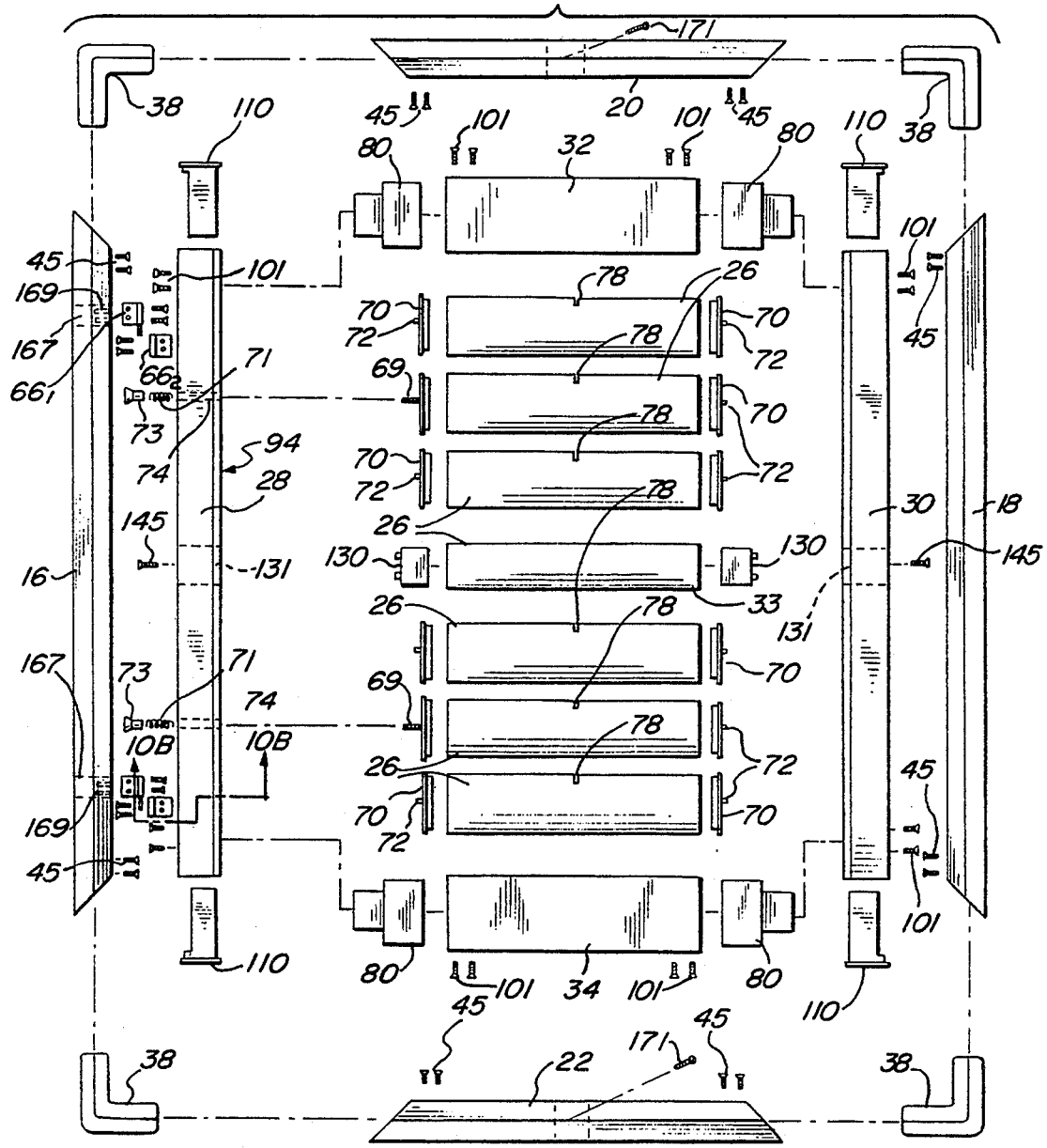
FIG. 10A is an exploded view of an alternative shutter embodiment of the invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a shutter door assembly constructed primarily of hollow extruded plastic components.

Referring to FIGS. 1–10B, a shutter door assembly 10 constructed in accordance with a preferred embodiment of the invention will now be described.

Shutter door assembly 10 includes a generally rectangular outer frame or casement 12 supporting a generally rectangular vaned door panel 14. Outer frame 12 includes a pair of parallel vertical supporting frame members or legs 16 and 18 connected to a pair of parallel horizontal supporting frame members or legs 20 and 22. Door 14 includes a louver door or vane assembly 24 comprised of a set of parallel vanes 26, each pivotally mounted to an interior of a panel or door frame 27. Panel frame 27 includes a pair of parallel vertical stiles 28 and 30 and a pair of horizontal parallel rails 32 and 34.

Although shown in the figures as including only a single louver door, shutter door assembly 10 may be provided with two or more louver doors, either in a side-by-side arrangement with each louver door mounted directly to opposing vertical support frame members, or with a pair of louver doors mounted in an articulated arrangement wherein a first or inner louver door or panel mounts directly to outer frame 12, with a second louver door or louver panel hingeably mounted to an outer free edge of the first louver panel. For simplicity, however, in the drawings only a single louver door or louver panel is illustrated.

Vanes 26 are pivotally mounted to interior side surfaces of vertical stiles 28 and 30, as shown more clearly in FIG. 6. A central tilting rod 35 connects centers of vanes 26 to allow the vanes to be pivoted about horizontal axes to thereby allow the vane assembly to open or close to allow greater or lesser amounts of light or air to pass through the shutter door.

All of the just-described components of the shutter door assembly are constructed primarily of hollow extruded plastic to provide a lightweight, easy-to-assemble, durable shutter door assembly.

Internal connecting mechanisms provided to mount the various components together into a single sturdy shutter door will now be shown and described with specific reference to FIGS. 2–10B.

Referring first to FIG. 2, an upper left-hand corner of outer frame 12 is shown in exploded view. As can be seen from FIG. 2, supporting frame members 16 and 20 are each hollow. Both frame members 16 and 20 have a generally L-shaped cross-section (see also FIG. 4). Likewise, each frame member is provided with an angled end portion 36. The angled end portions are oriented at an angle of 45 degrees from side surfaces of the frame members. The provision of the angled end portions allows ends of frame members 16 and 20 to be joined in abutment at right angles. The size and shape of frame members 16 and 20 match to form a single smooth right angle joint when end portions 36 are joined (FIG. 3).

To secure the frame members together, a corner block 38 is provided. The corner block includes first and second extending arms, 40 and 42 respectively, provided for insertion into the hollow interiors of frame members 16 and 20, respectively. Corner block 38 is constructed of a hollow injection molded plastic. Extending arms 40 and 42 have generally L-shaped cross-sections, matching the L-shaped cross-sections of the frame members. However, the cross-sectional size of extending arms 40 and 42 is slightly smaller than the cross-sectional size of frame members 16 and 20 to allow the extending arms to be inserted into the hollow interior of the frame members, as shown in FIGS. 3 and 4. Once opposing elbow members are inserted into both ends of upper support leg 20, the elbow members are then also inserted into the vertical frame members 16 and 18.

A pair of screws, each individually denoted 45, are drilled through an inner surface of frame member 16 into extending arm 40 of corner block 38. Predrilled bore holes may be provided in frame member 16 to facilitate insertion of screws 45. A second pair of screws 45 are mounted through an inner surface of horizontal frame member 20 into extending arm 42 of corner block 38.

In this manner, upper left-hand corner block 38 is securely mounted within side frame member 16 and top leg 20 and, as can be seen clearly in FIG. 3, corner block 38 is completely enclosed therein such that it is not visible from the exterior. A lower left corner block is inserted into a bottom end of side frame member 16 in the same manner to allow bottom leg 22 to be securely mounted to a bottom end of side frame member 16. A similar corner block connects bottom leg 22 with the bottom end of side frame member 18. Each corner block is secured with two pairs of mounting screws. Thus, a total of four corner blocks allow the four frame members of frame 12 to be securely mounted together into a single rigid, rectangular frame.

Door panel 14 is mounted to frame 12 by a pair of hinges 66 formed along an inner edge of side supporting frame member 16, as shown in cross-section in FIG. 5.

Each hinge includes two separable portions, $66_1$ and $66_2$, respectively (see also FIG. 10A). Hinge portion $66_1$ is mounted to outer frame 12, whereas hinged portion $66_2$ is mounted onto louver door 14. Hinge portion $66_1$ and hinge portion $66_2$ engage to allow the door panel to be pivotally attached to the outer frame. However, with the provision of separable hinge portions, door panel 14 may be completely separated from and removed from outer frame 12. A pair of screws may be used to mount the hinge portions into the frame or door. A hinge mounting block 167 is positioned within the outer frame for receiving the screws. Hinge mounting block 167 may be provided with brass threaded apertures 169 for improved durability.

The various components of door panel 14, and the manner in which they are assembled, will now be described with reference to FIGS. 6A–9. As noted above, door panel 14 includes a pair of vertical stiles 28 and 30, and a pair of upper and lower rails 32 and 34. A set of vanes 26 are mounted to interior side walls of the stiles to form a vane assembly 24. Each vane 26 is constructed of extruded hollow plastic and includes opposing end caps, generally denoted 70, inserted within open ends of the hollow vanes. Each end cap 70 includes a protruding pivot tab 72 which is received within a bore 74 formed in the interior side walls of the hollow stiles 28 and 30.

Tilting rod 35 connects the centers of each of the vanes to allow all of the vanes to be simultaneously pivoted by equal amounts. Tilting rod 35 is also constructed of hollow extruded plastic, has a flat rear surface, and includes a longitudinal slot 77 along its entire flat rear surface. A set of end caps (not shown) are provided for plugging the ends of the hollow tilting rod.

A set of t-hook members 75 is provided. Each t-hook member, shown most clearly in FIG. 6B, is a rectangular I-bar plate sized for insertion onto slot 77. Each t-hook member 75 includes a single t-hook 76 which extends rearwardly from rod 35. The t-hook members are of uniform length and are sized such that, when inserted into tilting rod 35, t-hooks 76 are spaced by an amount corresponding to spacing between vanes 26.

A vertical slot 78 is formed within one side edge of each vane 26. Slots 78 are shown most clearly in FIG. 10A. Each t-hook 76 is received within a corresponding slot 78 to thereby secure the tilting rod to the vanes. When assembled, slots 78 are substantially vertical, whereas t-hooks 76 are substantially horizontal. The perpendicular alignment of the vanes and t-hooks ensures that the t-hooks remain mounted within the slots. To initially mount tilting rod 35 to vanes 26, t-hooks 76 are inserted into slots 78, then tilting rod 35 is inserted onto t-hook members 75.

As can be seen from FIG. 6B, t-hooks 76 are not symmetric, i.e., t-hooks 76 extend a greater distance from one side of a t-hook member than the other side. The asymmetric configuration of t-hooks 76 facilitates mounting t-hook 76 into slots 78.

Referring again to FIG. 6A, upper and lower rails 32 and 34, and left and right stiles 28 and 30 of door panel 14 are configured and assembled in a manner similar to that of the components of frame 12. However, right-angled corner blocks are not used.

Upper rail 32 has a generally rectangular cross-section. Inserted into opposing ends of upper rail 32 are a pair of rectangular tongue joints 80. Each tongue joint 80 includes a hollow rectangular body portion 82 sized to be closely received within the interior of rail 32, and a smaller rectangular protruding tongue 84, which extends outwardly from a closed end 86 of base portion 82.

Stile 30 includes a rectangular slot 92 formed on an interior wall 94. A stile end cap 110 is provided for insertion into an open top end 98 of stile 30. Stile end cap 110 has a generally rectangular cross-section sized to be closely received within the hollow interior of stile 30. Stile end cap 110 includes an open rectangular chamber 100 formed within its interior, bounded by upper and lower walls 102 and 104 and side walls 106 and 108. Cavity 100 is sized for closely receiving tongue 84.

Stile end cap 110 is inserted into open end 98 of stile 30 until cavity 108 is aligned with rectangular slot 92. Next, rectangular tongue 84 is inserted through slot 92 into cavity 100.

The opposing end of top rail 32 is mounted to stile 28 in much the same manner. A second locking member 110 is provided for insertion into an open end of stile 28. A protruding tongue extends from top rail 32 mounts through a slot (not shown), and is securely received within a cavity (also not shown) within locking member 110.

A pair of screws 101 may be drilled through an outer side surface of each stile into tongue 84 of each tongue joint 80. A second pair of screws 101 may be drilled through an outer side surface of each end of upper rail 32 into tongue joint 80. Alternatively, other attachment mechanisms may be employed, such as glue or other adhesives.

Upper and lower rails 32 and 34 are shown in cross-section in FIGS. 7 and 8. These figures show how the components of rails 32 and 34 fit within each other as described above.

A door knob 120 (FIG. 1) may be mounted to a side surface of side wall 30 to allow for the easy opening and closing of the door.

FIG. 10A provides an exploded view of the entire shutter assembly except for the tilting rod, showing a different embodiment having upper and lower sets of vanes separated by a middle rail 33. Middle rail 33 is hollow and is mounted into the centers of vertical stiles 28 and 30 with center section fixing blocks 130. Fixing blocks 130 are mounted within hollow ends of middle rail 33 and protrude into apertures in vertical stiles 28 and 30, where they are secured by stile blocks 131 mounted within the hollow interiors of the stiles. Screws 145 are provided for securing blocks 130 into the apertures in the middle rail.

An additional screw 171 is provided for mounting the outer frame directly into a wall for securing the entire shutter to the wall.

Hinge portions $66_1$ and $66_2$, described above with reference to FIG. 5, are shown in FIG. 10A. Hinge portion $66_1$ includes a protruding pin which detachably engages with a shaft formed in hinge portion $66_2$. Alternatively, hinge portion $66_2$ may be provided with the protruding pin, whereas hinge portion $66_1$ includes the shaft.

Figure 10B:
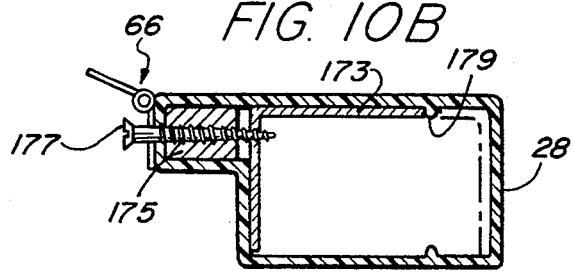
FIG. 10B is a cross-sectional view taken along line 10B—10B of FIG. 10A, showing a reinforcing mechanism.

Referring now to FIG. 10B, a reinforcing mechanism is shown which reinforces inner stile 28 to allow stile 28 to bear the full weight of door 14. FIG. 10B provides a cross-sectional view of stile 28, showing a metal L-shaped stiffener 173 which extends along the entire length of the interior of the stile and abuts the inner edges of two sides of the stile. Also shown is a solid plastic rod 175, preferably formed of polyvinyl chloride, which also extends along the entire interior length of stile 28. However, where L-shaped stiffener 173 occupies a central portion of the interior of stile 28, rod 175 occupies a projecting portion. Hinge mounting screws 177 are self-tapping screws within rod 175. However, bores in hinge 66 and stiffener plate 177 are preferably predrilled. The outer surface of stile 28 against which the hinge is mounted, rod 175 and stiffener 173, together provide a sandwich structure which significantly reinforces stile 28 to prevent any damage to the stile by the weight of door 14. An interior facing notch or rim 179 may be provided to help hold L-shaped stiffening plate 173 properly within the interior of stile 28. In yet an alternative embodiment, stiffener plate 173 may be formed as shown by dotted lines as a U-shaped plate for even greater structural reinforcement.

The reinforcing mechanism shown in FIG. 10B is particularly desirable in embodiments where door 14 has substantial weight, such as if it is particularly wide. Also, the reinforcing mechanism is desirable if a pair of articulated doors (not shown) are used rather than a single door. In such an embodiment, described above, two or more vertical doors are provided in a parallel arrangement, with one of the doors mounted to stile 30 of an inner door. The additional weight of the second vertical door acting upon hinges 66 may cause damage to stile 28 if the reinforcing mechanism of FIG. 10B is not employed. In such an embodiment, the reinforcing mechanism is also preferably included within stile 30, and perhaps in the stiles of the additional door as well.

A centermost vane of each set of vanes is preferably securely pivotally mounted to interior wall 94. This is achieved by providing threads on an extended end tab 69 of central vane 26. Bore 74, which receives tab 69 of central vane 26, is provided with a female nut 73 for engaging the threads. A washer (not shown) and a spring 71 are additionally provided, as shown, to increase friction between an outer edge of the end cap of the central vane and inner side wall 94. This friction prevents the vanes from pivoting freely. The central vane is securely screwed into bore 74.

What has been described is a shutter door assembly constructed primarily of extruded plastic components, yet being designed and assembled to simulate an actual wooden shutter door assembly. The various components are securely mounted together to provide a sturdy, durable shutter door. The shutter door assembly is designed for easy assembly without requiring the use of any tools other than a common household drill and screwdriver. The shutter door may be easily constructed from its component parts within a fairly brief amount of time. The components are preferably shipped to jobbers, retailers, or customers in an unassembled form to minimize shipping and storage costs. The jobber, retailer, or customer then may quickly and easily assemble the shutter door for final sale or use.

Components of various sizes may be shipped in a complete set such that a customer's order for a specific sized door may be filled by combining components of appropriate size. In this manner, custom orders are easily filled by a retailer without requiring a special order assembled at a factory.

The plastic components are extruded by a method which achieves a realistic look and feel such that the resulting components appear much like painted wood. The extrusion method and an apparatus for implementing the method will now be described with reference to the remaining figures.

FIG. 11 provides an exploded perspective view, somewhat in schematic form, of an extrusion system 200, for extruding hollow plastic tubes such as those used in the above-described shutter assembly. Extrusion system 200 includes an extrusion head 202 having a generally circular extrusion aperture 204, from which a circular tube of extrudant (not shown in FIG. 11) is extruded. Extrusion head 202 is of conventional design and manufacture and will not be described in further detail, other than to indicate that a cone 206 may be provided within extrusion aperture 204 for achieving a desired thinness of the extruded circular tube.

Mounted immediately adjacent to extrusion head 202 is a combination after-former/calibrator, collectively identified by reference numeral 205. A first portion of combination after-former/calibrator 205 is an after-former 208. After-former 208 includes a circular entry aperture 210 and a noncircular exit aperture 212. Entry aperture 210 has the same size and shape as extrusion aperture 204, and is positioned immediately adjacent to extrusion aperture 204 for directly receiving a tube of extrudant extruded from aperture 204. Exit aperture 212 is shaped to match the desired cross-section of a final tube. In FIG. 11, exit aperture 212 has a rectangular shape for producing a rectangular tube of extrudant. However, exit aperture 212 may have any arbitrary cross-sectional shape for forming any desired tube. Thus, exit aperture 212 may alternatively be square, L-shaped, etc.

The total circumference or perimeter of the periphery of exit aperture 212 is approximately equal to the circumference of the periphery of entrance aperture 210.

A conversion conduit 214 connects entry aperture 210 and exit aperture 212. Conversion conduit 214 is a generally conical, hollow conduit which connects the periphery of the entry aperture to the periphery of the exit aperture. Thus, at entry aperture 210, conversion conduit 214 has a circular cross-section. At exit aperture 212, conversion conduit 214 has a rectangular cross-section. The conversion conduit is shaped to smoothly transform from a circular shape to a rectangular shape.

The extrudant enters conversion conduit 214 through entry aperture 210, and exits conversion conduit 214 through exit aperture 212. As the tube of extrudant passes along the interior of conversion conduit 214, the tube is gradually transformed from the initial circular cross-section to the final desired rectangular cross-section. To ensure that the extrudant adapts to the shape of the conversion conduit, a vacuum system 230 is provided. Vacuum system 230 operates to maintain the tube of extrudant against the interior walls of conversion conduit 214. Vacuum system 230 may be any of a variety of conventional vacuum systems, such as those used in conventional extrusion calibrators. In particular, the vacuum system may withdraw air from conversion conduit 214 through a plurality of small slots 218 formed along the entire interior surface of the conversion conduit. By maintaining a vacuum pressure through the slots, the extrudant is drawn outwardly and maintained against the interior walls of the conversion conduit.

various other means for maintaining the extrudant against the interior of the conversion conduit may be used. For example, a means may be provided for pumping air into the hollow interior of the extrudant tube to press the extrudant outward against the walls of the conversion conduit. Generally, any of a variety of vacuum or pressure mechanisms employed within extrusion calibrators may be employed within the conversion conduit for maintaining the extrudant against the interior walls of the conduit.

A cooling system 228 is also provided which cools the extrudant as it passes through the conversion conduit- Preferably, water is sprayed against the extrudant through the slots- The water may include an antistatic detergent for preventing dust from clinging to the extrudant. The water/detergent coolant also helps to lubricate the extrudant. The cooling system may comprise, for example, a manifold of tubes (not shown) surrounding conduit 226 from which the cooling liquid is pumped.

Thus, as the extrudant is extruded from extrusion head 202, it passes into and through conversion conduit 214, where its cross-sectional profile is gradually transformed from circular to rectangular. Vacuum system 230 ensures that the extrudant does not collapse inwardly. By the time the extrudant exits the after-former portion of combined after-former/calibrator 205, the cross-section of the extrudant has been transformed to a rectangular cross-section. However, it has been found that the extrudant does not, and need not, precisely match the rectangular shape of exit aperture 212. Rather, the extrudant tube typically has slightly rounded corners corresponding to the sharp corners of the exit aperture. These rounded corners occur if the vacuum system does not fully draw the extrudant into the corners. Thus, a generally rectangular extrudant tube is achieved having rounded corners. As noted above, rounded corners are considerably stronger than sharp corners. Further, rounded corners achieve a smoother and more desirable aesthetic shape for the final tube. Thus, when used to form the shutter assembly described above, the curved corners of the extruded plastic tubes help to provide a realistic, wood-like appearance.

The roundness of the corners of the extrudant tube may be varied by at least one of two techniques. First, to reliably form tubes having rounded corners, the exit aperture 212 may be formed with rounded corners 215, rather than sharp corners. To provide tubes having sharper corners, an exit aperture having sharp corners is employed. The amount of vacuum pressure acting upon the extrudant in the vicinity of corners 215 also affects the sharpness of the resulting corner. Thus, if only a few vacuum slots 218 are provided along corners 215 of conversion conduit 214, then the extrudant will have somewhat rounded corners- However, if many vacuum slots 218 are provided along corners 215 of conduit 214 for maintaining a vacuum pressure along the corners, then the extrudant will be more completely drawn into the corners of the conduit, to thereby produce a final extruded tube having fairly sharp corners.

The initial circular cross-sectional shape of an exemplary extrudant is shown in FIG. 12A. The cross-section of FIG. 12A is that of an extrudant immediately prior to entry into entry aperture 210. In FIG. 12A, the extrudant is represented by reference numeral 220.

In FIG. 12B, the cross-sectional profile of the tube of extrudant is shown immediately after emerging from exit aperture 212. As can be seen from FIG. 12B, extrudant 220 has generally rounded corners 222.

Combination after-former/calibrator 205 also includes a calibrator portion 224 for further cooling of the rectangular tube of extrudant after it exits from the conversion conduit. Calibrator 224 includes a rectangular internal conduit 226 having the same rectangular shape and size as exit aperture 212 of after-former 208. The tube of extrudant enters conduit 226 and passes therethrough. Within conduit 226, the extrudant is cooled by a cooling system 228, described above.

Vacuum system 230 is also connected to calibrator portion 224 for maintaining the tube of extrudant against the interior walls of conduit 226 to prevent the tube of extrudant from collapsing inwardly while it is being cooled.

Ultimately, the tube of extrudant having the desired rectangular cross-section emerges from conduit 226 of calibrator 224 in a solid, cooled form.

Preferably, the after-former/calibrator comprise a single integral unit provided with a single vacuum system and a single cooling system. However, the calibrator and after-former may be separate devices, each provided with separate cooling systems and vacuum systems. As a single integral unit, after-former portion 208 does not have a true exit aperture 212. Rather, conversion conduit 214 is integrally formed with conduit 226 of calibrator portion 224.

Although shown and described as forming a tube of extrudant having a rectangular cross-section, it should be appreciated that any arbitrary shape may be formed by selecting the appropriate internal conduit shapes of after-former 208 and calibrator 224. For example, to form the tubes of the shuttle assembly described above, a variety of different-sized L-shaped conduits are provided. Also, the conversion conduit may be configured to receive a noncircular extrudant and convert it to another noncircular shape or possibly to a circular shape. Although shown and described as having an after-former separate from the calibrator, these components may be integrally formed. In such an embodiment, a first half of a combined unit would operate to convert the tube of extrudant to the desired shape, whereas a second half of the combined unit would operate to cool the extrudant.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A device for forming an extruded tube having a desired cross-sectional shape, said device comprising:

means for extruding a tube of extrudant, said tube having an initial cross-sectional shape, said initial cross-sectional shape being different form said desired cross-sectional shape; and after-former means for converting said tube of extrudant form said initial cross-sectional shape to said desired cross-sectional shape, wherein said after-former means comprises:

a conversion conduit for receiving said tube of extrudant, said conversion conduit being substantially conical and having an entry aperture of substantially the same size and cross-sectional shape as the tube of extrudant and positioned to directly receive the tube of extrudant without prior modification, and an exit aperture having the desired cross-sectional shape, said entry aperture and said exit aperture each having peripheries of substantially the same perimeter, said substantially conical conversion conduit connecting the periphery of said entry aperture to the periphery of said exit aperture; and means for maintaining said tube of extrudant against inner walls of said substantially conical conversion conduit such that, as the tube of extrudant passes through said substantially conical conversion conduit, the cross-sectional shape of the tube of extrudant is smoothly transformed from the initial cross-sectional shape to the desired cross-sectional shape.

2. The device of claim 1, wherein the initial cross-sectional shape of the tube of extrudant is circular.

3. The device of claim 2, wherein the desired cross-sectional shape of the tube of extrudant is noncircular.

4. The device of claim 3, wherein the desired cross-sectional shape of the tube of extrudant is rectilinear.

5. The device of claim 4, wherein the desired cross-sectional shape of the tube of extrudant includes rounded corner portions.

6. The device of claim 1, further including a calibrator for cooling said tube of extrudant, said calibrator having an internal conduit of the desired cross-sectional shape for receiving the tube of extrudant from the after-former means, and having means for cooling the extrudant.

* * * * *